United States Patent
Guy et al.

(10) Patent No.: US 9,806,903 B2
(45) Date of Patent: Oct. 31, 2017

(54) DEVICE COMMUNICATION WITH POWER DISTRIBUTION UNITS

(71) Applicant: Cisco Technology, Inc., San Jose, CA (US)

(72) Inventors: Jason Guy, Morrisville, NC (US); Jonathan Beck, Apex, NC (US); Matt Tarkington, Raleigh, NC (US); Nipul Shah, Raleigh, NC (US); Nick Mitchell, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 14/529,836

(22) Filed: Oct. 31, 2014

(65) Prior Publication Data
US 2016/0124477 A1    May 5, 2016

(51) Int. Cl.
| | | |
|---|---|---|
| *H04L 12/40* | (2006.01) | |
| *H04L 12/10* | (2006.01) | |
| *H04L 12/28* | (2006.01) | |
| *H04B 3/54* | (2006.01) | |

(52) U.S. Cl.
CPC ........ *H04L 12/40045* (2013.01); *H04L 12/10* (2013.01); *H04B 3/54* (2013.01); *H04L 12/2803* (2013.01); *H04L 12/2838* (2013.01); *H04L 2012/2843* (2013.01)

(58) Field of Classification Search
CPC ..... H04B 3/54; H01R 25/003; H04L 12/2803; H04L 12/281; H04L 12/2832; H04L 12/2838; H04L 2012/2843; H04L 12/40045; H04L 12/10; Y02E 10/763; Y04S 20/18

See application file for complete search history.

(56) References Cited

U.S. PATENT DOCUMENTS

| | | | | |
|---|---|---|---|---|
| 5,554,968 | A * | 9/1996 | Lee ................. | H04B 3/542 340/310.18 |
| 7,413,471 | B2 * | 8/2008 | Chan ................ | H04B 3/56 439/505 |
| 9,391,452 | B1 * | 7/2016 | Cousinard ....... | H02J 1/00 |
| 2003/0043028 | A1 * | 3/2003 | Torikai ............. | H04B 3/54 340/12.32 |
| 2006/0291497 | A1 * | 12/2006 | Binder ............. | H04B 3/54 370/436 |
| 2007/0157272 | A1 * | 7/2007 | Kim ................. | H04B 3/542 725/100 |
| 2007/0189182 | A1 * | 8/2007 | Berkman ......... | H04B 3/54 370/252 |
| 2009/0263999 | A1 * | 10/2009 | Onoue ............. | H01R 13/713 439/215 |

(Continued)

*Primary Examiner* — Terrell Johnson
(74) *Attorney, Agent, or Firm* — Hickman Palermo Becker Bingham LLP (57) ABSTRACT

In an embodiment, a data processing system comprises: a power distribution circuit that is configured to distribute electrical power to one or more network devices; a microcontroller; data transceiving logic that is configured to establish connectivity with the one or more network devices and the power distribution apparatus; receive a first data stream from a first network device; generate a combined signal by combining the first data stream with a power signal into the combined signal; one or more ports that are configured to transmit the combined signal to the one or more network devices.

20 Claims, 7 Drawing Sheets

(56) References Cited

U.S. PATENT DOCUMENTS

| | | | | |
|---|---|---|---|---|
| 2011/0022245 A1* | 1/2011 | Goodrum | ............... | H04L 12/10 |
| | | | | 700/297 |
| 2012/0119577 A1* | 5/2012 | Clarke | ............... | H02J 3/14 |
| | | | | 307/40 |
| 2012/0275084 A1* | 11/2012 | Familiant | ............... | H04B 3/54 |
| | | | | 361/601 |
| 2012/0275526 A1* | 11/2012 | Hughes | ............... | H04B 3/542 |
| | | | | 375/257 |
| 2016/0124477 A1* | 5/2016 | Guy | ............... | H04L 12/40045 |
| | | | | 713/300 |

* cited by examiner

DEVICE COMMUNICATION WITH POWER DISTRIBUTION UNITS

FIELD OF THE DISCLOSURE

The disclosure generally relates to data communications techniques in computer networks. The disclosure relates more specifically to techniques for enabling data communications over power distribution connections established between network devices and power supply devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Smart Power Distribution Units (smart PDUs) may be used to provide electrical power to devices in network laboratories and data centers. For example, smart PDUs may be used to distribute power resources from one or more power busses to a plurality of devices. Sometimes, they may also be configured to provide additional functionalities such as monitoring of a power usage on a per-outlet basis or provide some power-related services to the system administrators. The term "smart" signifies that the PDU typically includes a microcontroller, firmware, or other control logic that can execute stored programs of various kinds.

Smart PDUs may be placed in stationary physical locations. Their locations are typically fixed and known. Also, since the smart PDUs are rarely moved from one location to another, they usually serve the same group of collocated devices.

Most smart PDUs require that a user manually maps devices onto power connections of the PDUs. Since the manual process is usually prone to human error, manually created mappings are often a source of errors that may be time consuming to correct.

DETAILED DESCRIPTION OF EXAMPLE EMBODIMENTS

In the following description, for the purposes of explanation, numerous specific details are set forth in order to provide a thorough understanding of the present approach. It will be apparent, however, that the present approach may be practiced without these specific details. In other instances, well-known structures and devices are shown in block diagram form in order to avoid unnecessarily obscuring the present approach.

1. General Overview

Embodiments provide techniques for an approach for enabling data communications via power supply connections in a network. In an embodiment, a data processing system comprises a power distribution apparatus configured to distribute electrical power to one or more network devices and communicate with the one or more network devices. The power distribution apparatus comprises logic configured to establish connectivity with the one or more network devices and the power distribution apparatus. The logic may also be configured to receive a data stream from a first network device and combine the data stream with a power signal into a combined signal.

In an embodiment, the power distribution apparatus comprise one or more ports configured to transmit the combined signal to the one or more network devices.

2. Structural Overview

In an embodiment, the approach enables network devices and smart PDUs to add a management interface across power connections between the devices and PDUs. The management interface may be implemented using various technologies, such as smart power connection technologies. For example, a management interface may be integrated with a HOMEPLUG residential networking power connection or a power connection implemented using a similar technology.

Integrating a management interface with a smart PDU allows managing the devices that draw power from the PDU. Also, integrating a management interface with a smart PDU may allow eliminating reliance on traditional Top-Of-Rack (TOR) switches for directing power to the devices. Furthermore, integrating a management interface with a smart PDU may allow simplifying the installation of the smart PDU system and reduce an overall cost of the installation. The approach may also allow tracking locations of the devices which may be dispersed in a large area. For example, the approach may allow tracking physical locations of the devices, which may be particularly useful when the devices are located in large data centers or large computing centers.

Figure 1:
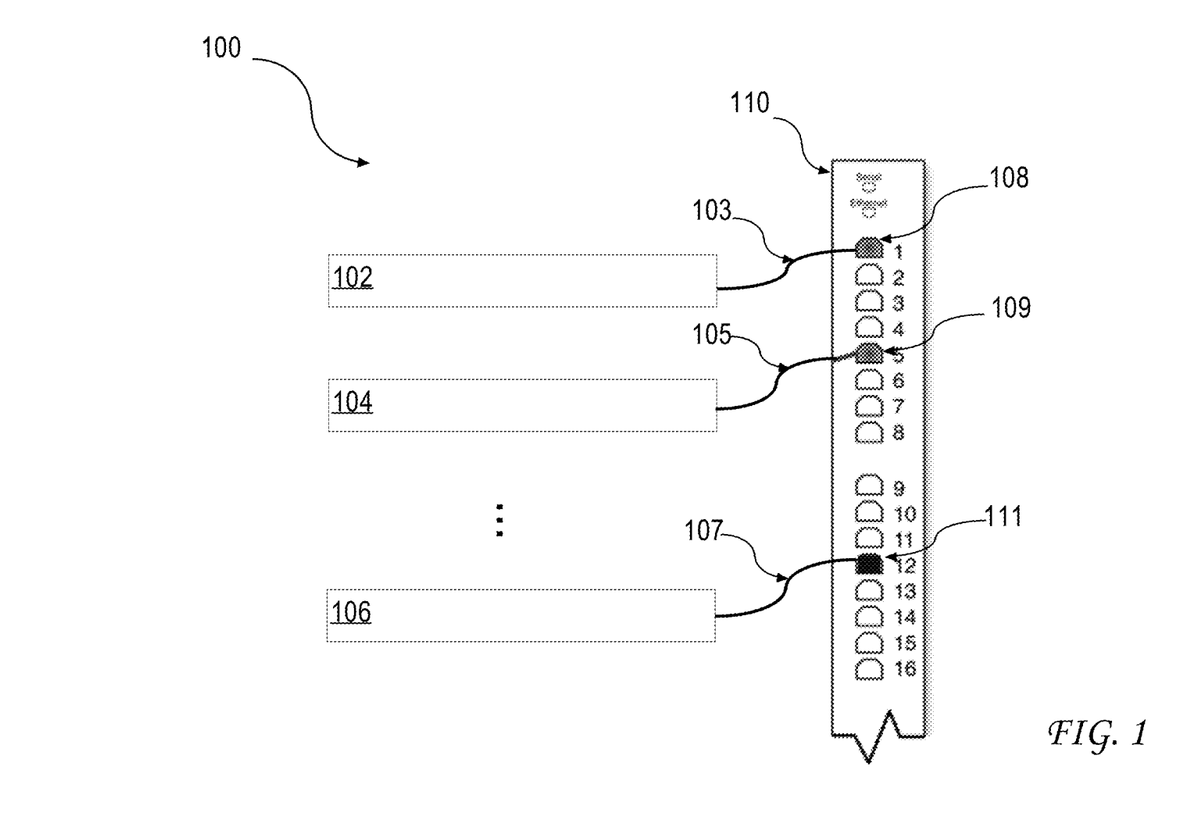
FIG. 1 illustrates an example of a network environment for an approach for enabling data communications via power supply connections in a network.

FIG. 1 illustrates an example of a network environment 100 for an approach for enabling data communications via power supply connections in a network. In the depicted example, a smart PDU 110 is configured to communicate with one or more devices 102, 104, 106. Devices 102, 104, 106 may be directly or indirectly connected to smart PDU 110 and may be configured to draw power from smart PDU 110. Devices 102, 104, 106 may be any type of computer devices that consume electrical power. For example, devices 102, 104, 106 may include personal computer, desktop computers, laptop computers, main frame computers, servers, routers, bridges, but also smart phones, tablets, and the like.

Although FIG. 1 depicts three network devices 102, 104, 106, network environment 100 may include any number of network devices. Since smart PDU 110 may have a plurality of power supply outlets, a plurality of network devices may be connected to smart PDU 110 and draw electrical power from smart PDU 110. Furthermore, devices in the plurality of network devices may be of different types and have different power requirements. For example, the devices may be routers, switches or other elements of network infrastructure.

Furthermore, although FIG. 1 depicts only one smart PDU 110, network environment 100 may include any number of PDUs. The PDUs may be supplied by different manufacturers and may have different configurations. The PDUs may be integrated into network environment 100 using additional hardware or hardware-software components that enable the PDUs to supply power supplies having various characteristics and specifications.

Smart PDU 110 may be any type of a PDU equipped with logic programmed to support data communications via power connections established between smart PDU 110 and network devices. For example, smart PDU 110 may comprise hardware-implemented logic that is configured to support data communications via power connections. Smart PDU 110 also may comprise hardware-software modules implementing the logic configured to support data communications via power connections established between the PDU and network devices.

In an embodiment, devices 102, 104, 106 are directly or indirectly connected to smart PDU 110. Direct connections may be implemented in proprietary cables configured to communicate combined signals including both data streams and electrical power signals. Indirect connections may comprise connections that are concatenated to each other and as a whole, are configured to communicate the combined signals. For the purpose of the presented approach, the direct and indirect connections are treated similarly since they both perform the same functionalities.

In the example depicted in FIG. 1, device 102 is connected to a port 108 of smart PDU 110 via a communications link 103. Device 104 is connected to a port 109 of smart PDU 110 via a communications link 105. Device 106 is connected to a port 111 of smart PDU 110 via a communications link 107. If network environment 100 comprises additional devices and additional PDUs, then additional communications links may be used to connect the additional devices to the power supply sources.

In an embodiment, smart PDU 110 is equipped with an interface configured to uniquely fingerprint each connection of a plurality of connections established between smart PDU 110 and devices 102, 104, 106. The interface may be used to track and verify the PDU's connectivity with devices 102, 104, 106, and verify operational states of the connections and the connected devices.

Logic in the PDU 110 may implement a communications protocol using a data transmission medium, and to enable communications between devices 102, 104, 106 and between the devices and smart PDU 110, the devices may be connected to a power supply to draw electrical power and to power up the device components.

In an embodiment, smart PDU 110 comprises one or more power outlets (ports) that are configured to provide power to devices 102, 104, 106, and also to enable data communications with and between devices 102, 104, 106. The quantity of the ports implemented on smart PDU 110 depends on the implementation and any number of ports may be implemented on one power supply strip.

Connections 103, 105, 107 between smart PDU 110 and devices 102, 104, 106 may act as both power supplying connections and data communications connections. For example, connections 103, 105, 107 between smart PDU 110 and devices 102, 104, 106 may be adapted to provide electrical power to devices 102, 104, 106 and to enable data communications between and with devices 102, 104, 106.

In an embodiment, data connection 103, 105, 107 between smart PDU 110 and devices 102, 104, 106 may use Ethernet-over-Power (EoP) in conjunction with the HOMEPLUG Powerline Alliance standard or a similar technology.

In the EoP approach, devices may establish communications connections at the lower communications layers that are specified under the Open System Interconnection (OSI) model. For example, devices 102, 104, 106 may establish with smart PDU 110 communications connections at the physical level, the link level, and the like.

In an embodiment, smart PDU 110 are perceived by other devices as an Ethernet switch equipped with power ports, each of which acts as an EoP termination point. In some implementations, smart PDU 110 may comprise a small Ethernet switch to handle the termination of the Ethernet signal and data.

4. Ethernet-Over-Power Interface in a Straight Connector

In one embodiment, data communications over power supply connections of smart PDU 110 uses an EoP interface implemented between smart PDU 110 and the network devices. In another approach, the implementation may include Y-cables.

Figure 2:
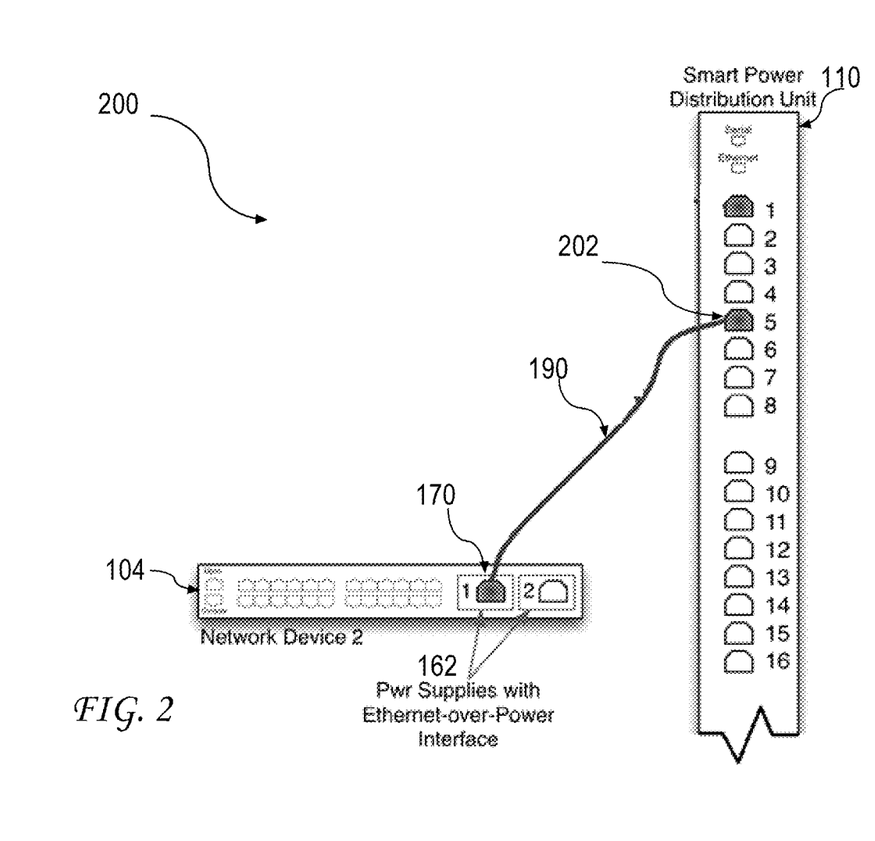
FIG. 2 illustrates an example of a network environment for an approach for enabling data communications via straight power supply connections in a network.

FIG. 2 illustrates an example of a network environment 200 for an approach for enabling data communications via straight power supply connections 190 in a network. In this context, a straight power supply connection is a connector that has two endpoints and a communications medium between the endpoints. Typically, a straight power supply connector is configured to receive a signal on one endpoint, and transmit the signal along the connector to another endpoint. The connector may be configured to communicate signals simultaneously in both directions.

In an embodiment, an approach for enabling data communications via power supply connections via a straight connector is implemented in an EoP interface. In this implementation, network device 104 implements an EoP interface to receive and transmit signals communicated via straight connector 190, and smart PDU 110 implements an EoP interface to receive and transmit signals communicated via straight connector 190.

An EoP interface may be implemented in a transceiver. Network device 104 may implement an EoP transceiver in port 170, and use the EoP transceiver to transmit signals to smart PDU 110 via connector 190 and to receive signals from smart PDU 110 via connector 190. Smart PDU 110 may implement an EoP transceiver in port 202, and use the EoP transceiver to receive signals from device 104. An EoP transceiver of network devices 104 may be integrated with circuitry of port 170 of network device 104, while an EoP transceiver of smart PDU 110 may be integrated with a modular power supply unit of smart PDU 110.

In an embodiment, a port 202 is configured to facilitate data input-output from an EoP transceiver implemented in smart PDU 110, and port 170 is configured to facilitate input-output from an EoP transceiver implemented in network device 104. A communication connector 190 may be used to connect port 202 of smart PDU 110 with port 170 of network device 104, and thus to integrate an EoP interface of smart PDU 110 with an EoP interface of network device 104.

There are many ways of integrating an EoP transceiver with a power supply unit within smart PDU 110. For example, a combination of the EoP transceiver and the power supply unit may comprise a field replaceable interface such as a Small Form-factor Pluggable (SFP) transceiver.

The EoP transceiver may also be integrated in the chassis of device 104. Integrating an EoP transceiver with device 104 may ensure uninterrupted, Ethernet-based communications with device 104.

5. Ethernet-Over-Power Interface in a Y-Cable

In an embodiment, enabling data communications via power supply connections originated at smart PDU 110 is implemented by utilizing Y-cables and the EoP transceiver is incorporated in a Y-cable. The EoP transceiver incorporated in the Y-cable may be used in addition to transceivers implemented in smart PDUs and transceivers implemented in network devices, or may be used in place of the respective transceivers.

Figure 3:
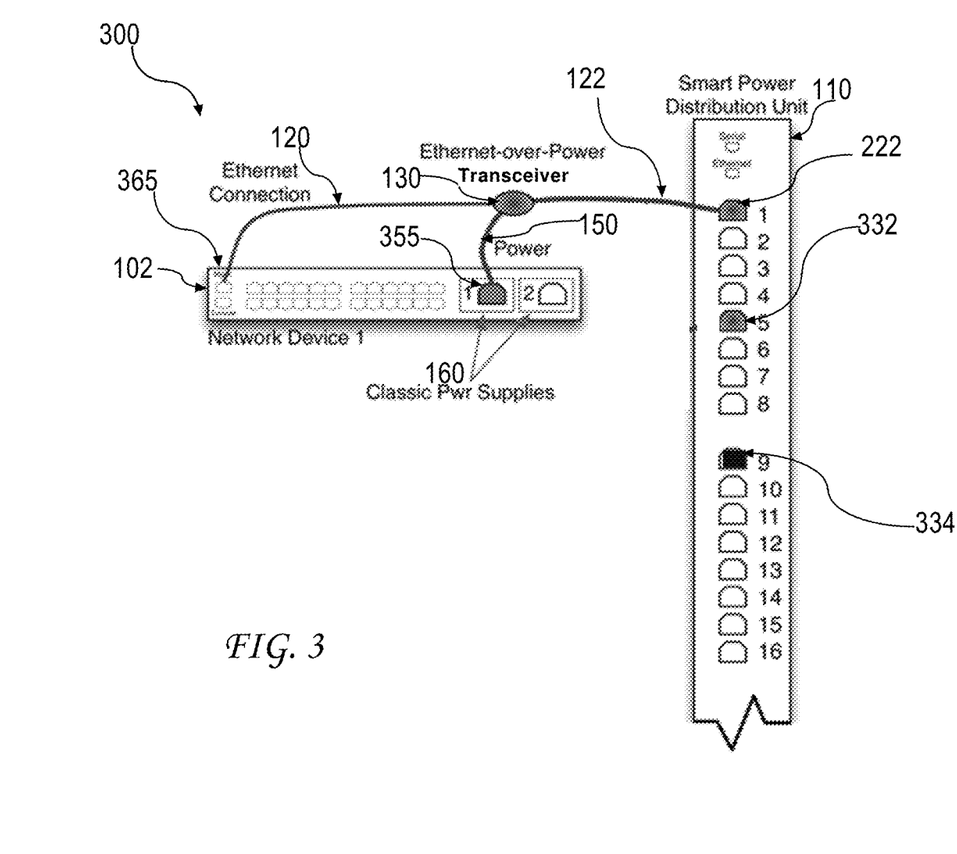
FIG. 3 illustrates an example of a network environment for an approach for enabling data communications via Y-cable power supply connections in a network.

FIG. 3 illustrates an example of a network environment 300 for an approach for enabling data communications via Y-cable power supply connections in a network. In the depicted example, smart PDU 110 is equipped with a plurality of ports, including a port 222, a port 332, and a port 334. Smart PDU 100 may supply electrical power and data to network device 102. Network device 102 is equipped with a plurality of ports, including an Ethernet port 365, and power supply ports 160. Power supply ports 160 may include a power supply port 355.

The Y-cable of FIG. 3 comprises a bottom portion 122, a first top portion 150, a second top portion 120, and an EoP transceiver 130. Bottom portion 122, first top portion 150 and second top portion 120 all meet at EoP transceiver 130. Bottom portion 122 of the Y-cable may be plugged into a power supply port 222 of smart PDU 110, first top portion of the Y-cable may be plugged into a power supply port 355 of device 102, and a second top portion of the Y-cable may be plugged into an Ethernet port 365 of device 102. An EoP transceiver may be implemented at the junction of the Y-cable. Bottom portion 122 may be used to carry data signals and power signals between smart PDY 110 and transceiver 130. Transceiver 130 may be configured to process the received data signals and power signals, and separate them into data signal and power signal. The data signal may be transmitted via second top portion 120 to Ethernet port 365 of network device 102. Second top portion 120 may be implemented as an Ethernet connection with network device 102. The power signal may be transmitted to power supply port 355 of network device 102.

In an embodiment, an Ethernet signal communicated along a Y-cable may be modulated by transceiver 130 using an EoP signal and provided to smart PDU 110. Furthermore, an Ethernet signal communicated along a Y-cable may be modulated at smart PDU 110 using an EoP signal and provided to transceiver 130.

In an embodiment, the approach utilizing a Y-cable may be viewed as a modification of an EoP approach, or as a migration to EoP approach implementations for legacy devices. For example, the Y-cable implementations may allow utilizing some of the legacy connectivity between power supply devices and network devices.

6. Hybrid Ethernet-Over-Power Interfaces

Figure 4:
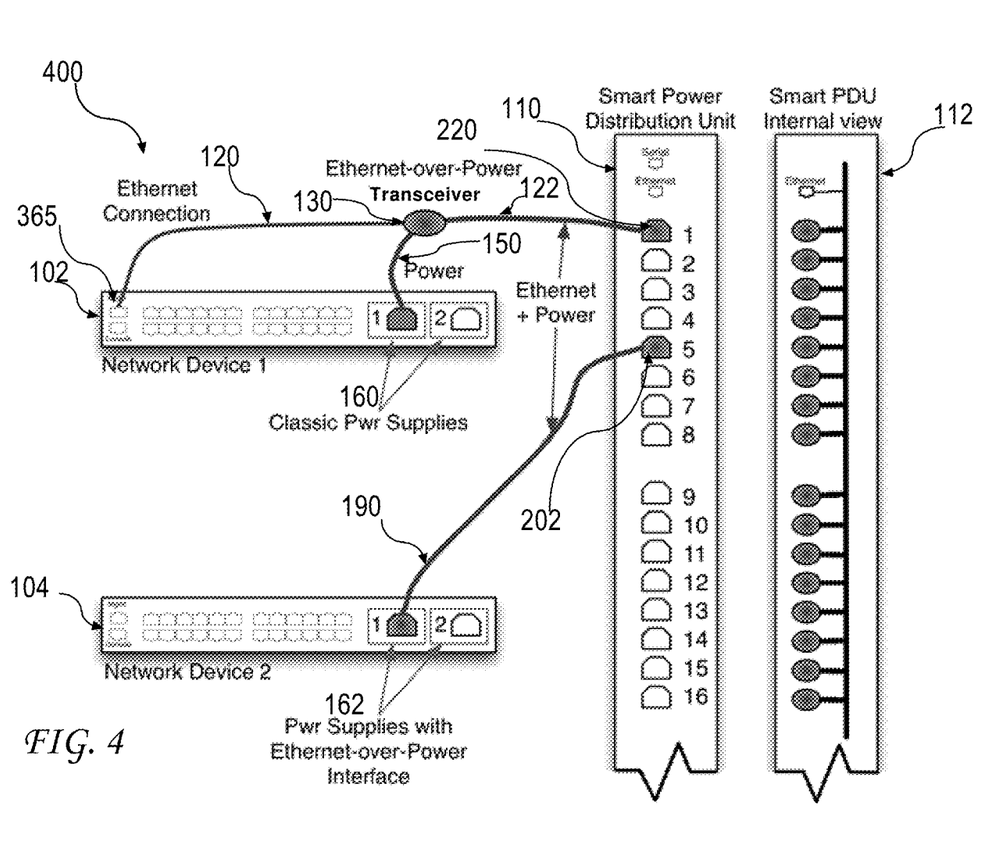
FIG. 4 illustrates an example of a network environment for an approach for enabling data communications via straight power supply connections and Y-cable power supply connections in a network.

FIG. 4 illustrates an example of a network environment 400 for an approach for enabling data communications via straight power supply connections and Y-cable power supply connections in a network. Network environment 400 implements a hybrid configuration of EoP interfaces because includes at least straight power supply connections described in FIG. 1 and at least one Y-cable power supply connections. Although FIG. 4 depicts only one straight power supply connection and one Y-cable connection, network environment 400 may include any number of the straight connections and any number of Y-cable connections.

In the depicted example, smart PDU 110 has a plurality of ports, including a port 220 and a port 202. Ports 220 and 202 are described in the sections above relating to FIG. 1 and FIG. 2, respectively.

Smart PDU 110 transmits electrical power and data to network devices 102, 104 Network device 102 has a plurality of ports, including classic power supply ports 160 and at least one Ethernet port 365. Network device 104 has a plurality of ports, including EoP ports 162. Network devices 102 and 104 are described in FIG. 1-2, respectively.

Port 220 of smart PDU 110 may be configured to transmit to transceiver 130 a combined signal comprising a power signal and data. Transceiver 130 may be configured to separate the power signal from the data, and transmit the power signal via a power connection 150 to one of the power ports 160. Transceiver 130 may also be configured to transmit the data via an Ethernet connection 120 to Ethernet port 365. EoP interfaces implemented to communicate data combined with a power signal are described in FIG. 3.

Port 202 of smart PDU 110 may be configured to transmit to one of the EoP interface-enabled ports 162 of network devices 104 a combined signal, comprising a power signal and data. The combined signal may be transmitted via a link 190. Port 202 may be used as an input/output of an EoP transceiver implemented in smart PDU 110, while ports 162 may be used as input/outputs of EoP transceivers implemented in network devices 104. EoP transceivers implemented in smart PDU and network devices 104 are described in FIG. 2.

The hybrid configuration for implementing EoP interfaces for communicating combined signals, comprising data and power signals, provide many benefits. For example, the hybrid configuration may allow incorporating legacy devices, such as for example network device 102, into an integrated network environment 400, and thus enable communicating data along with power signals to the legacy devices that do not have EoP interfaces installed.

Furthermore, the hybrid configuration may allow integrating legacy devices, such as network device 102, with network devices that implement EoP interface, such as network device 104, to communicate with each other using a power signal as a medium.

Moreover, a hybrid configuration may allow selecting any of the legacy devices or upgraded devices to act as a managing unit. A managing unit may be configured to manage other devices in network environment 400 by communicating with the devices and PDUs by sending data combined with power signals.

7. Ethernet-Over-Power Interfaces of Devices with Multiple Power Supply Ports

Smart PDUs may include ports that have a single power supply outlet (port) and devices that have multiple power supply ports. Examples of a smart PDU that have multiple power supply ports are depicted in FIG. 1, FIG. 2, FIG. 3, FIG. 4. For example, in FIG. 3, smart PDU 110 comprises several power supplies outlets, including a power supply port 222, a power supply port 332, and a power supply port 334.

There are many ways of utilizing EoP interfaces of a smart PDU that has multiple power supply ports. For example, each power supply port may have one or more separate EoP connections to a smart PDU. In this approach, the smart PDU may have one or more separate EoP connections. Each EoP interface may be an independent data-link and network interface. A system level virtual interface may still be used for a common termination point.

According to another approach, a system level EoP management interface may be created for a smart PDU equipped with multiple power supply outlets (ports). The system level EoP management interface may be viewed as a virtual management interface, and may utilize a plurality of EoP links. The EoP interfaces may be bundled just as port-channels may be bundled. For example, each EoP connection may be a member link of the bundled EOP interface. A similar bundled EoP interface may be used on the smart PDU side to match.

According to other approach, a plurality of EoP interfaces may be operated in an active/standby mode. In this mode, a single EoP connection could act as the primary management link, while the other member connections may continue to provide power, while acting as hot-standby Ethernet connections. If the primary management link fails or for some reason becomes unavailable, a system level EoP management interface may initiate a replacement or swapping of power modules or adding new power modules to a system.

8. Testing Connectivity with a Smart PDU

Integrating an Ethernet signal within a power line, either via a Y-cable or native EoP enabled power supply connections, enables determining that the data received on a power port of a smart PDU is from a device that is connected to the smart PDU. For example, if a device draws power from a power port from a smart PDU, then the device is connected to the power port and the data received on the power port of the smart PDU cannot be from any other device. Thus, integrating the Ethernet signal within the power line allows creating a data transmission medium that is coupled to the power connection. Integrating the Ethernet signal with a power signal may provide electrical power from a smart PDU to a device and also permits testing whether the device is connected and responsive to the smart PDU.

In an embodiment, a power connection is a data transmission medium configured to exchange information directly between a device and a smart PDU.

9. Communicating Data Over EOP Enabled Connections

There are many ways of communicating data between a smart PDU and a device over an EoP enabled connection. In an embodiment, data may be communicated at any layer of the OSI model. For example, the data may be communicated at Layer 1 (physical layer), Layer 2 (data link layer), Layer 3 (network layer) and any other layer of the OSI model.

In an embodiment, data exchanged between a smart PDU and devices is communicated over Layer 1 (physical layer) of the OSI model. When the data is communicated over Layer 1, the smart PDU propagate a multiplexed EoP signal from the power module of the smart PDU to the device for later de-multiplexing.

In an embodiment, data exchanged between a smart PDU and devices is communicated over the Layer 2 (data link layer) or over the Layer 3 (network layer) of the OSI model. Examples of various EoP interface implementations at Layers 1-3 are described below.

10. Multiplexing and Demultiplexing of Signals Exchanged Between a Smart PDU and Devices In an embodiment, a multiplexer installed in smart PDU 110 may multiplex a power signal with digital data streams into one signal, and communicate the resulting multiplexed signal to an EoP transceiver 130.

In an embodiment, the EoP transceiver 130 may receive a signal from smart PDU 110, and demultiplex the signal into a power signal and one or more digital data streams. The power signal may be transmitted via a power link 150 to a power supply port 160 of device 102, while the digital data streams may be transmitted via an Ethernet connection 120 to an Ethernet port 365 of device 102.

Multiplexing and demultiplexing of signals exchanged between smart PDU 110 and device 102 may be implemented at Layer 1 of the OSI model.

In an embodiment, smart PDU 110 multiplexes a power signal with Ethernet data frames into one multiplexed signal. Then, smart PDU 110 transmits the multiplexed signal to an EoP transceiver 130.

In an embodiment, upon receiving a multiplexed signal, EoP transceiver 130 demultiplexes the multiplexed signal into a power signal and an Ethernet frame. Then, transceiver 130 forwards the power signal via a power link 150 to a power supply port 160 of device 102. Then, transceiver 130 forwards the Ethernet frame via an Ethernet connection 120 to port 365 of device 102.

Upon receiving a power signal via a power connection 150 at a power supply port 160, device 102 uses the power signal to maintain operations of components of device 102.

Upon receiving an Ethernet frame via an Ethernet connection 120, device 102 processes the Ethernet frames by invoking code instructions configured to process the Ethernet frames and generating responses to Ethernet frames if needed.

Device 102 sends a response Ethernet frame via Ethernet connection 120 to EoP transceiver 130, which communicates the response Ethernet frame to a port 220 of smart PDU 110. From port 220, the response Ethernet frame may be communicated to port 202 of smart PDU 110. The Ethernet frame may be multiplexed with a power signal, and the multiplexed signal may be transmitted from port 202 of smart PDU 110 via link 190 to port 162 of network device 104. Network device 104 may be a management device, so that upon receiving the multiplexed signal, the network device 104 may demultiplex the signal, extract the response Ethernet frame and use data of the response Ethernet frame to manage network device 102.

In an embodiment, link 190 is used as a management uplink. Thus, the management uplink may use the local power grid as a management network.

Panel 112 in FIG. 4 depicts an internal view of smart PDU 110. It depicts EoP interfaces as they may be connected to an internal Ethernet switch implemented in smart PDU 110.

11. Exchanging Data Frames Between a Smart PDU and Devices

In an embodiment, data exchanged between a smart PDU and devices is communicated over Layer 2 (data link layer) of the OSI model. When the data is exchanged using frames of Layer 2, a power module may be used to terminate the Ethernet frames and bridge the Ethernet frames to the device's communication architecture via a built-in physical interface or a pin. The built-in interface or the pin may be implemented in a power module of smart PDU 110.

12. Exchanging Data Packets Between a Smart PDU and Devices

In an embodiment, data exchanged between a smart PDU and devices is communicated over Layer 3 (network layer) of the OSI model. When the data is exchanged using data packets (datagrams) of Layer 3, the packets received via the power distribution path may be forwarded by a power module to network devices in a system management plane. In turn, devices of the system management plane may locally terminate the protocol and collect the data packets according to their sequence numbers.

In terms of terminating upper-layer protocols, an appropriate endpoint may be implemented in components of a smart PDU. For example, a smart PDU may be designed to act as an Ethernet switch configured to terminate multiple connections and having one or more data uplinks to an upstream management device. An upstream management device may be any device already included in network environment 400. For example, an upstream management device may be network device 104 configured to receive data from smart PDU 110 and network device 102 via an uplink 190.

13. Integration with Discovery Protocols

Communications of data between devices using an EoP approach may be implemented using one or more discovery protocols, such as Cisco Discovery Protocol (CDP) of Cisco Systems, Inc., San Jose, Calif. CDP defines a suite of commands that may be used to monitor network devices, connections between the network devices and the network as a whole. For example, CDP defines Type-Length-Value (TLV) structures that may be embedded in CDP commands. Example TLVs structures are described in detail below. The TLVs may be used to communicate EoP requests and responses.

In an embodiment, a smart PDU is configured to communicate with connected devices using EoP or HOME-PLUG to create Ethernet network over power connections. Below is one of many examples of communications that can be exchanged using CDP commands.

In one scenario, it is assumed that a device #1 corresponds to a network device 102 of FIG. 4, and thus is a legacy device. Device #1 is the type of device that have been commonly used, and that is equipped with modular power supplies and a separate management Ethernet port. To enable communications with a smart PDU that transmits to device #1 a combined signal, comprising data and a power signal, device #1 can be connected to the smart PDU via a Y-cable, described in FIG. 3-4. The Y-cable is equipped with an EoP transceiver located at a mid-cable location. The EoP transceiver demultiplexes the combined signal into an Ethernet signal and a power signal. As depicted in FIG. 3, a bottom portion 122 of the Y-cable is plugged into a port 222 of a smart PDU 110, a first top portion 150 (power connection) is plugged into a port 355 of network devices 102, and a second top portion 120 (Ethernet connection) is plugged into port 265 of network device 102.

In an embodiment, a smart PDY issues the following CDP command "show cdp neighbors". The CDP output generated in response to that command may look as follows:

| Device1# show cdp neighbors | | | | | |
|---|---|---|---|---|---|
| Device-ID Local | Intrfce | Hldtme | Capa-bility | Plat-form | Port ID |
| CscoSmrtPDU-RTP-D33 | Mgmt0 | 141 | S H | CSPDU-1 | Pwr1 |
| N7k-DC1-VPOD | Eth1/1 | 175 | R S s | N7K-C7010 | Eth2/1 |

Capability Codes:
R—Router,
T—Trans-Bridge,
B—Source-Route-Bridge
S—Switch,
H—Host,
I—IGMP,
r—Repeater,
V—VoIP-Phone,
D—Remotely-Managed-Device
s—Supports-STP-Dispute The above output indicates that the smart PDU has three neighbors. The neighbors include device identified as "CscoSmrtPDU-RTP-D33," a device identified as "N7k-DC1-VPOD," and a device identified as "CRS1-4-DD34." The device identified as "CscoSmrtPDU-RTP-D33" is connected to a local management interface, its messages can be held for 141 seconds, is implemented as a switch host on platform CSPDU-1, and uses Pwr1 as a port identifier. The device identified as "N7k-DC1-VPOD" uses Ethernet1/1 local interface, its messages can be held for 175 seconds, acts as a router/switch configured to support STP disputes, is implemented in N7K-C7010 platform and uses Eth2/1 as a port identifier. The device identified as "CRS1-4-DD34" uses Etherner1/2 local interface, its messages can be held for 161 seconds, acts as a router, is implemented in CRS platform and uses Ten0/1/0/0 as a port identifier. All that information may be obtained by the smart PDU by issuing a CDP command along an EoP connection 122 to a transceiver 130, which communicated the CDP command to other devices in the network, and upon receiving responses from the other devices from the network.

In another scenario, a device #1 is replaced by a device #2. Device #2 is assumed to correspond to a network device 104 of FIG. 2. Hence, device #2 (network device 104) has an EoP transceiver built into it. In this device, the power connections are also native data connections.

In an embodiment, a smart PDU issues the following CDP command "show cdp neighbors". The CDP output generated in response to that command may look as follows:

| Device2# show cdp neighbors | | | | | |
|---|---|---|---|---|---|
| Device-ID Local | Intrfce | Hldtme | Capa-bility | Plat-form | Port ID |
| CscoSmrtPDU-RTP-D33 | Pwr1 | 141 | S H | CSPDU-1 | Pwr1 |
| N7k-DC1-VPOD | Eth1/1 | 175 | R S s | N7K-C7010 | Eth2/1 |
| CRS1-4-DD34 | Eth1/2 | 161 | R | CRS | Ten0/1/0/0 |

Capability Codes:
R—Router,
T—Trans-Bridge,
B—Source-Route-Bridge
S—Switch,
H—Host,
I—IGMP,
r—Repeater,
V—VoIP-Phone,
D—Remotely-Managed-Device,
s—Supports-STP-Dispute The above output is identical to the scenario described previously. The above output indicates that the smart PDU has three neighbors. The neighbors include device identified as "CscoSmrtPDU-RTP-D33," a device identified as "N7k-DC1-VPOD," and a device identified as "CRS1-4-DD34." The device identified as "CscoSmrtPDU-RTP-D33" is connected to a local management interface, its messages can be held for 141 seconds, is implemented as a switch host on platform CSPDU-1, and uses Pwr1 as a port identifier. The device identified as "N7k-DC1-VPOD" uses Ethernet1/1 local interface, its messages can be held for 175 seconds, acts as a router/switch configured to support STP disputes, is implemented in N7K-C7010 platform and uses Eth2/1 as a port identifier. The device identified as "CRS1-4-DD34" uses Etherner1/2 local interface, its messages can be held for 161 seconds, acts as a router, is implemented in CRS platform and uses Ten0/1/0/0 as a port identifier. All that information may be obtained by the smart PDU by issuing a CDP command along an EoP connection 190 to network device 104, and upon receiving responses from the other devices from the network.

In both scenarios, from responses received to the "show pdu neighbors," a smart PDU may determine the devices that are connected to the ports of the smart PDU.

In the scenario when a device #2 (network device 104) is used, a cable 190 may have a hardware-built-in Authorization-Authentication-Accounting (AAA) module configured to enforce the usage of proprietary cables to connect to smart PDUs. While third-party cables could still be sufficient to supply electrical power to the devices, unauthorized third-party cables may be discouraged for implementing an EoP approach for communicating data via power supply connections. The cable-authorization could use unique fingerprints and algorithms to verify authenticity of the cables.

Determining fingerprints of the cables and tracking locations of the fingerprinted cables may also be used to determine whether the cables and devices have been rearranged in the network. For example, if a fingerprinted cable is disconnected from one device and connected to another device, than by monitoring the location of the fingerprinted cable a management module may determine rearrangements in the network.

Furthermore, by monitoring length of the cables used to connect devices to smart PDUs, a management unit may approximate distance of the connected device from the fixed location of the smart PDU, thus geolocation of the device can be obtained using triangulation. For example, assuming that a smart PDU is positioned at a fixed location, upon obtaining information about the cable length, a management unit may approximate a the distance between the smart PDU and devices drawing electrical power from the smart PDU are located. would have a fixed location set, and the connected device is within the cable length from that fixed point.

TLVs may be used to communicate requests, responses and various types of data between devices implementing EoP interfaces for communicating using power supply connections. For example, a TLV structure may include a request to provide a cable identification that is used to maintain a connection between smart PDU 110 and network devices 104. Another TLV structure may be used to include a response to the request. More particularly, it may include the requested cable identification. Other examples of requests, responses and data exchanged between the devices implementing EoP interfaces for communicating using power supply connections are described below.

Figure 5:
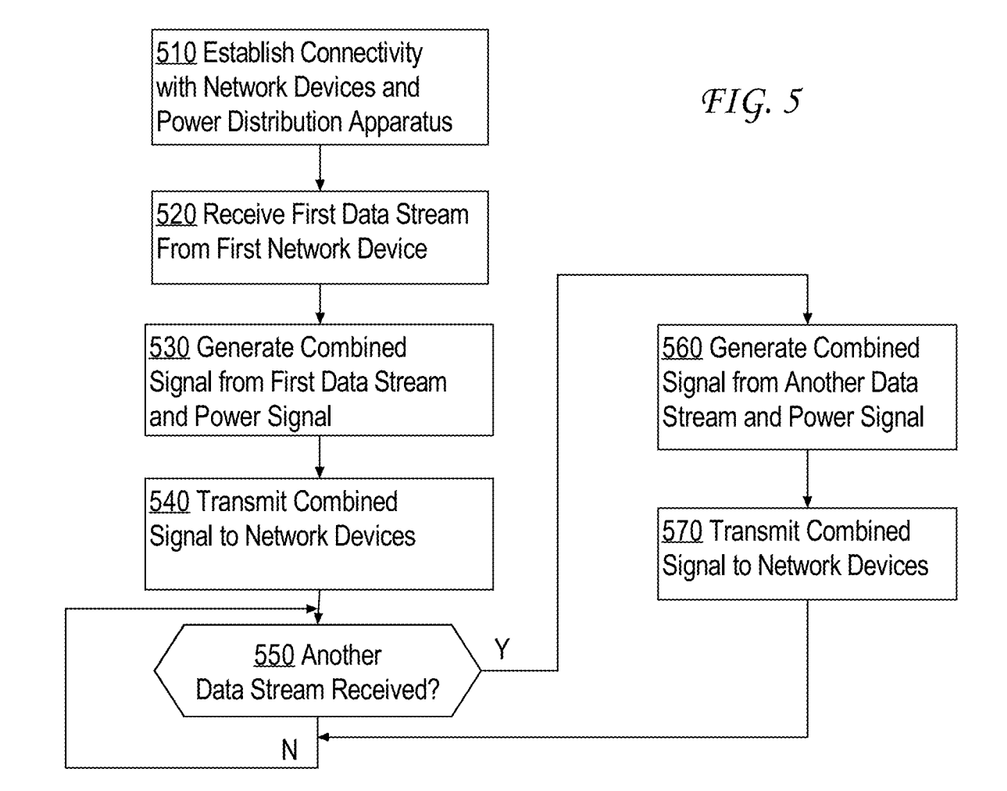
FIG. 5 illustrates a flow chart for a process for enabling data communications via power supply connections in a network.

16. Example Process for Enabling Data Communications Via Power Supply Connections FIG. 5 illustrates a flow chart for a process for enabling data communications via power supply connections in a network. The depicted process may be executed by a smart PDU, or any other devices configured to act as a PDU. The process of FIG. 5 may serve as an implementation guide for preparing digital logic, firmware, or stored programs executable in the PDU to perform the functions indicated in FIG. 5, using any of a variety of programming languages and environments including but not limited to assembler, C, JAVA, etc. In other words, FIG. 5 will serve to skilled persons as a specification not only of generic functions to be performed but will suggest the specific programming instructions, calls, methods and functions that can implement the digital logic, firmware, or stored programs.

In step 510, a smart PDU establishes connectivity with one or more network devices and a power distribution apparatus. For example, if a smart PDU acts as a power distribution apparatus, then the smart PDU may establish connectivity with the network devices using the physical connections (cables) connecting ports of the power distribution apparatus and the network devices. Connectivity with one or more of the one or more network devices may be implemented in a straight cable that supports both an Ethernet connection and a power-supply connection. Alternatively, connectivity with one or more of the one or more network devices may be implemented in a Y-cable that supports both an Ethernet connection and a power-supply connection.

In step 520, a smart PDU receives a first data stream from a first network device. The first data stream may include a request for providing certain information. For example, the request may be for providing any one of: a device identification data, a device port data, a cable identification data, a device platform identification data, a device local port identification data.

In step 530, a smart PDU generates a combined signal by combining a first data stream with a power signal. For example, the smart PDU may combine the first data stream with the power signal by multiplexing the first data stream with the power signal into the combined signal. Various techniques for multiplexing signals are described above.

In step 540, a smart PDU transmits a combined signal to one or more network devices. The combined signal may be transmitted to some devices via straight cables, each of which supports both an Ethernet connection and a power-supply connection, and to other devices via Y-cables, each of which supports both an Ethernet connection and a power-supply connection.

In step 550, a smart PDU tests whether another data stream is received at any of the ports of the smart PDU. If so, then the process proceeds to step 560; otherwise, the process loops in step 550.

In step 560, a smart PDU generates a combined signal from the received data stream and a power stream in a similar fashion as in step 530.

In step 570, a smart PDU transmits a combined signal to one or more network devices similarly as in step 540.

The process may be repeated each time a new data stream is received on any of the ports of a smart PDU. When no new data stream is received on any of the ports of the smart PDU, the PDU may transmit just a power signal to the network devices to maintain their operational states.

Figure 6:
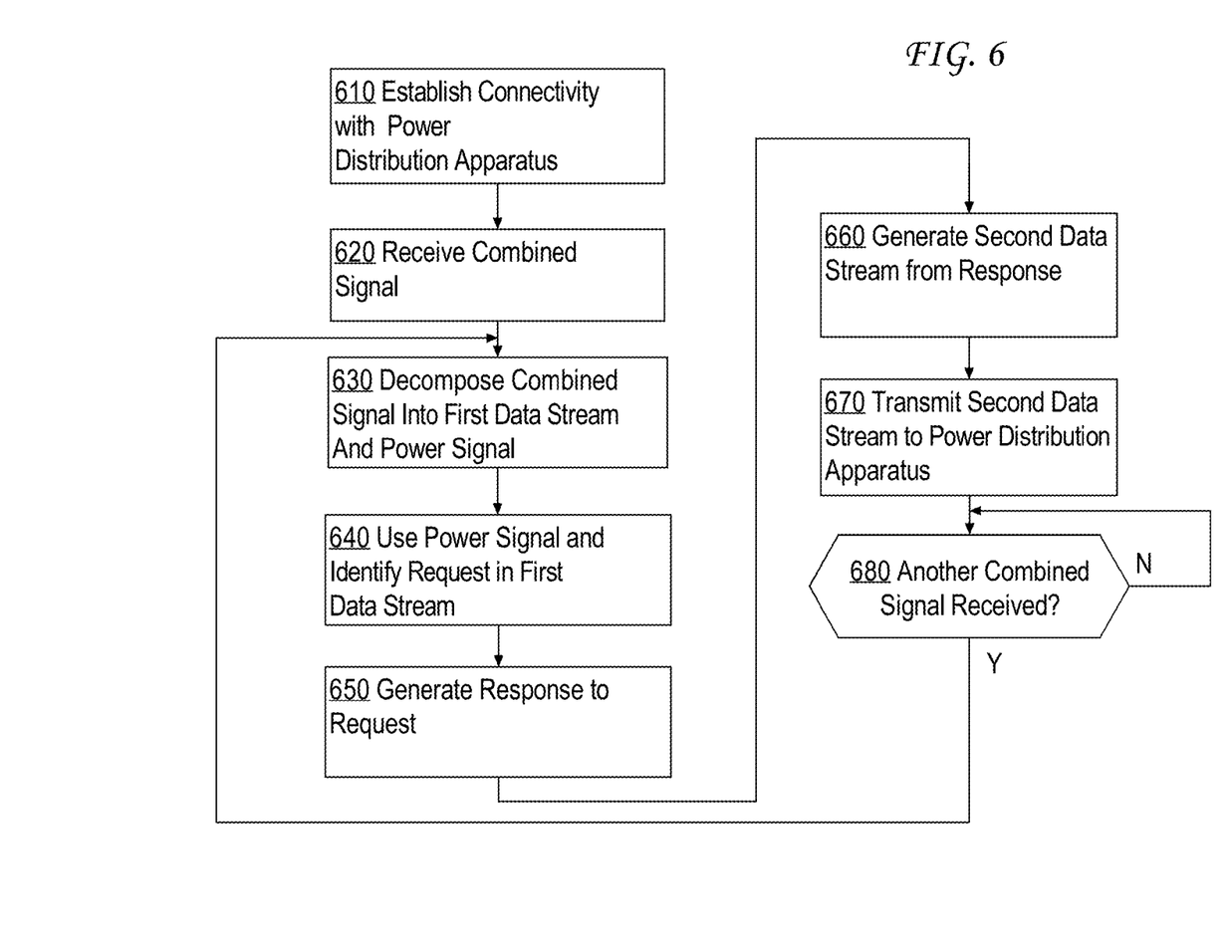
FIG. 6 illustrates a flow chart for a process for enabling data communications via power supply connections in a network.

FIG. 6 illustrates a flow chart for a process for enabling data communications via power supply connections in a network. The depicted process may be executed by a network device that draws electrical power from a smart PDU and communicates with the smart PDU using a straight cable configured to process both a data stream and a power signal. The process of FIG. 6 may serve as an implementation guide for preparing digital logic, firmware, or stored programs executable in the PDU to perform the functions indicated in FIG. 6, using any of a variety of programming languages and environments including but not limited to assembler, C, JAVA, etc. In other words, FIG. 5 will serve to skilled persons as a specification not only of generic functions to be performed but will suggest the specific programming instructions, calls, methods and functions that can implement the digital logic, firmware, or stored programs.

In step 610, a network device establishes connectivity with a power distribution apparatus. Various methods of establishing the connectivity are described above.

In step 620, a network device receives a combined signal. The combined signal may comprise a first data stream and a power signal.

In step 630, a network device decomposes a combined signal into a first data stream and a power signal. In an embodiment, the combined signal is received by a network device transceiver implemented in the network device. The network device transceiver may decompose the combined signal into the first data stream and the power signal, transmit the first data stream to a processing unit of the network device, and transmit the power signal to a power unit of the network device.

In step 640, a power unit of the network device receives a power signal and provides the power signal to components of the network device. Also, a processing unit of the network device may analyze a first data stream, and extract a request from the data stream. The request may include a request for any one of: a device identification data, a device port data, a cable identification data, a device platform identification data, a device local port identification data.

In step 650, a processing unit of the network device analyzes the received request, and generates one or more responses to the request. For example, the responses may include the requested information, such as a device identification data, a device port data, a cable identification data, a device platform identification data, or a device local port identification data.

In step 660, a network transceiver of the network device generates a second data stream based on one or more response generated by a processing unit of the network device.

In step 670, a network transceiver of the network device transmits a second data stream to a power distribution apparatus, In step 680, a network device determines whether another combined signal is received on any of the ports of the network device. If another combined signal is received on a port of the network device, then the process proceeds to step 630; otherwise the process loops in step 680.

17. Types of Information Obtainable Using an Ethernet-Over-Power Approach

In an embodiment, devices use data frames, data packets or TLV structures embedded within data frames or data packets to advertise various types of information. The advertised information may include identifiers of the device's hostname, physical interface, and the like. The data frames, data packets and the TLV structures may be collectively referred to as EoP communications.

In an embodiment, EoP communications may be used to discover PDUs available in a network. For example, TLV structures embedded in data frames and data packets may be used to send discovery commands, requests information from the discovered PDUs, query the PDUs for additional information, and the like.

Using EoP communications may also allow implementing a device-discovery process and may ensure that the discovered information about the devices and connections is accurate. For example, a device may embed a discovery command into a TLV structure of a data frame, broadcast the data frame to the network, and in response to the broadcast, receive responses embedded in TLV structures in received data frames. Responses may include a variety of information, including information about available PDUs. Such information may include information about a location of the PDU, power port connections available on the PDU, power usage monitoring information, and the like.

Furthermore, EoP communications may be used to discover and identify other devices in a network. In situations when several power interfaces are connected to various PDUs, each PDU may request and receive the device identification from each of the devices connected to the PDU. For example, a PDU may request and receive information from each device connected to the PDU, and the received information may include the device identifier (Device ID), the connection identifier (Connection ID), and the like.

Devices may also use EoP communications to request information about available ports on PDUs. In situations when several devices are connected to various PDUs, the devices may request and receive the PDU connectivity information, such as a port location, a PDU location, and the like.

Exchanging EoP communications may also allow determining locations of the devices and PDUs in a network. Since a device that draws power from a PDU needs to be connected to at least one port on at least one PDU, the devices and the PDU are usually collocated to some extent. For example, if a PDU is located in a data center, then devices that draw power from the PDU are most likely also located in the same data center. If a PDU is located in a computer laboratory, then the devices that draw power from the PDU are most likely collocated with the PDU, and thus are also located in the same computer laboratory.

Devices may also use EoP communications to collect information about network assets and to inventory network resources. A power cable may be encoded with a unique security fingerprint and other defining characteristics using embedded microchips. The unique security fingerprint may identify the manufacturer of the cable in a unique way. The cable fingerprint may be encoded in a TLV structure, embedded in a data frame or a data packet, and communicated to a management unit. Upon receiving the data frame/packet, the management unit may extract the TLV data structure from the data frame/packet, then extract the cable fingerprint from the TLV structure, and test whether the fingerprint corresponds to the fingerprints used by any authorized manufacture. Thus, the cable fingerprints communicated using EoP communications may be used to determine whether the power cables used by the PDUs and devices are provided by the authorized cable manufacturers. This approach may also be used to enforce authorization of official cables, and identifying usage of authorized and unauthorized power cables.

Furthermore, a power cable may contain an encrypted microchip designed to authenticate with a smart PDU. This type of authentication may be used to ensure that customers purchase proprietary cables, not non-branded cables. The chip may also be configured to encode information about the cable serial number, the cable length, the cable gauge, and the like.

In an embodiment, a proprietary cable may be also identified by data indicating the cable length and the cable design, such as a Y-cable-design or a straight EoP cable design. The cable identification may be read by PDUs and communicated to a management device. Upon receiving the cable identification data, the management device may parse the identification data and determine the length and design of the cable. That information may be collected and used to inventory and trace the network assets.

In an embodiment, a power interface is used for an out-of-band management connection via a PDU. For example, in a data flow, a PDU may be connected upstream from one or more network devices, and may communicate the collected data about the network inventory and assets to a management device. For example, a network device acting as a management device may request, receive and collect information about the network inventory and assets, and the collected information may be stored or communicated to other devices.

Using a power interface for an out-of-band management connection allows eliminating the need for extra TOR Ethernet switches, which are otherwise implemented in conventional networks to provide an out-of-band connectivity. Using a power interface as an out-of-band management connection allows managing traffic at the control-plane or a management-plane. It also allows ensuring separation of management traffic sent over the power distribution path and user/network control traffic sent over a system interface. In some cases, a smart PDU could replace a TOR, thus simplifying the installation of devices in a network and reducing overall costs of the installation.

18. Example Benefits of Implementing Ethernet-Over-Power Interfaces on Smart PDUs Implementing EoP interfaces on smart PDUs provides many benefits. For example, automatically collecting and disseminating information between networking devices and smart PDUs may be performed. Adding data communication across a power connection allows also utilizing the same connections (power supply connection) for two purposes: providing electrical power to devices and communicating with the devices.

Moreover, network devices and smart PDUs may use the interfaces to exchange information about the devices, smart PDUs, ports, connectivity, configurations and the like. The ability to request and obtain that information by the devices themselves eliminates the need for a manual issuance of queries, a manual collection of the information, and a manual storing of the information. Since manual operations are more prone to errors than operations executed automatically by the devices, utilizing EoP interfaces on smart PDUs allows collecting information that is more accurate and reliable.

Furthermore, implementing EoP interfaces on smart PDUs allows identifying devices in a network and identifying relative locations of the devices in the network. Based on the relative locations of the devices in the network, a management device may determine whether any of the devices or the connections are redundant and may be eliminated.

Moreover, implementing EoP interfaces on smart PDUs also allows analysing power usage by devices. When power connections are initially established, or later modified, the protocols such as CDP/LLDP generate updates containing information about the devices connected to smart PDUs. That information may be generated and disseminated periodically to other devices in an automatic fashion. Upon receiving such periodic updates, a smart PDU may determine a connectivity layout between the devices. For example, a smart PDU may determine the devices that are connected to various PDUs, the ports to which the devices are connected, the active ports on the smart PDUs, and the like. This information may be used to examine the power usage by the devices, to determine power supply redundancy, and to perform other types of power supply analysis.

Also, EoP interfaces implemented on smart PDUs may be used by devices to discover smart PDUs from which the devices may draw power. For example, if a device is moved from one location to another, the device may "re-announce" itself to other PDUs, some of which may now located closer to the device. Upon discovering the other PDUs, the device may generate a request to a management device and include in the request an identification of the other PDUs. Upon receiving the request, an administrator of the management device may select one of the other PDUs as suitable for providing power to the device, and modify the power supply connections to the device to allow the device to draw the power from the selected PDU.

The approach may be implemented based on network technologies such as HOMEPLUG, CDP or LLDP protocols, and Ethernet. For example, the approach allows network devices and smart PDUs to add a management interface across the power connection using HOMEPLUG or similar technology. The management interface may allow managing the network devices without the need for a traditional TOR switch. Eliminating the need for a TOR switch may simply the installation of the computer network and may reduce the overall cost of the installation.

The approach may also be viewed as a secure way for tracking locations and presence of devices within a large laboratory or a data center.

The approach may be implemented in any networking device, host device and power distribution units configured with HOMEPLUG or other residential power networking standards. Implementing the approach may include adding a circuitry to existing power supply hardware of the network devices to allow for the creation of an internal network connection to an operating system. The power distribution units may also be equipped with additional circuitry to communicate over the power outlets and to discover devices in the network. Furthermore, implementing the approach may also include upgrading the devices to a new version of the CDP or LLDP protocol to work over a powerline-Ethernet interface. The discovery protocols (like CDP or LLDP) may be implemented on the network devices to support the EoP approach for communicating data over the power link connections.

19. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
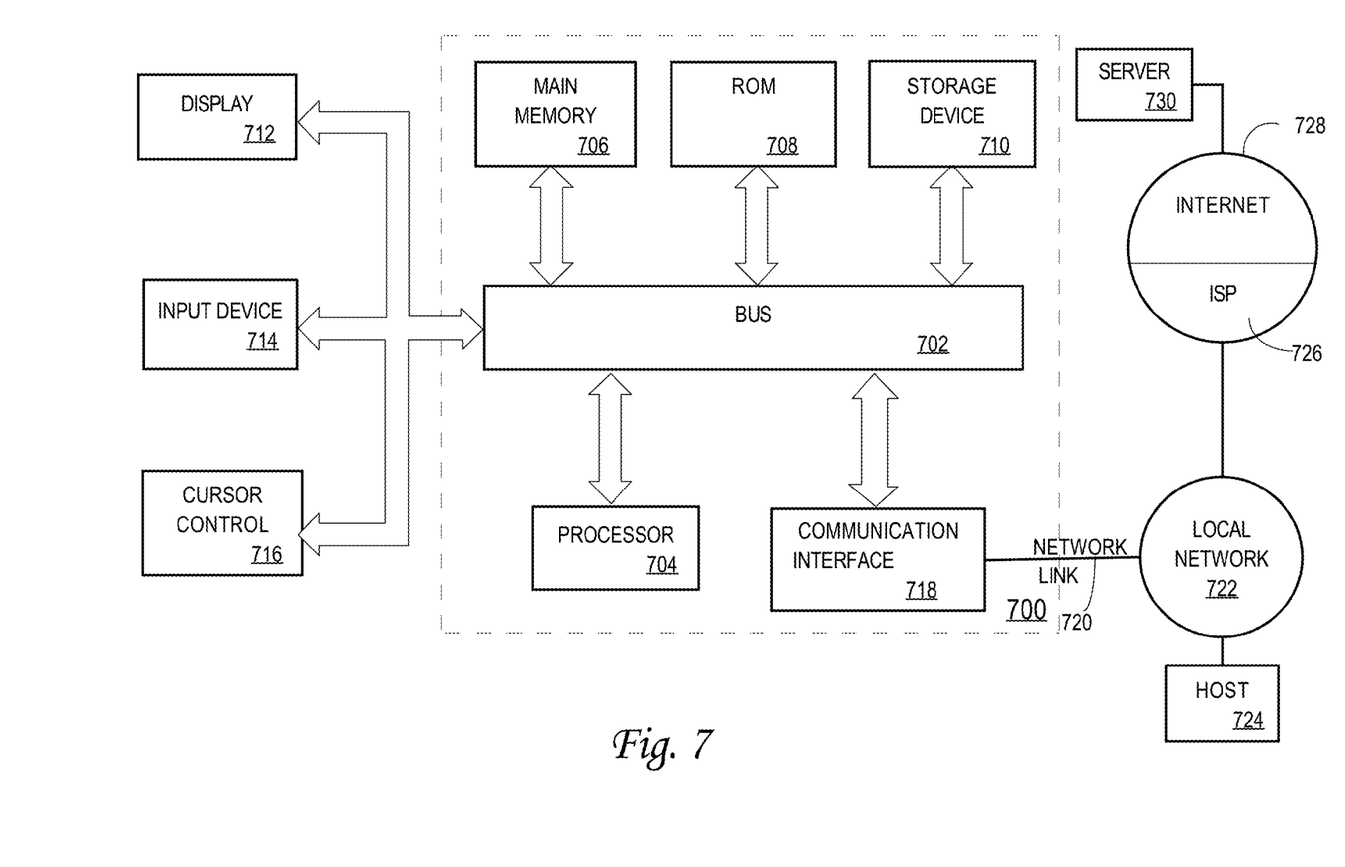
FIG. 7 illustrates a computer system with which various embodiments may be used.

For example, FIG. 7 is a block diagram that illustrates a computer system 700 upon which an embodiment of the approach may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A power distribution apparatus comprising:
 a power distribution circuit that is configured to distribute electrical power to one or more network devices;
 a microcontroller;
 data transceiving logic that is configured to establish Ethernet connectivity with the one or more network devices and the power distribution apparatus; receive a first data stream from a first network device of the one or more network devices; generate a combined signal by combining the first data stream with a power signal into the combined signal;

one or more ports that are configured to transmit the combined signal to the one or more network devices.

2. The power distribution apparatus of claim 1, wherein the data transceiving logic is configured to combine the first data stream with the power signal by multiplexing the first data stream with the power signal into the combined signal.

3. The power distribution apparatus of claim 1, wherein the first data stream received from the first network device comprises a request for providing any one of: a device identification data, a device port data, a cable identification data, a device platform identification data, a device local port identification data.

4. The power distribution apparatus of claim 3, wherein the combined signal is received by a Y-cable transceiver implemented in the Y-cable; wherein the Y-cable transceiver is configured to decompose the combined signal into the first data stream and the power signal, to transmit the first data stream to an Ethernet port of a second network device, from the one or more network devices, and to transmit the power signal to a power port of the second network device.

5. The power distribution apparatus of claim 1, further comprising a straight cable that carries both an Ethernet connection and a power-supply connection to one or more of the one or more network devices.

6. The power distribution apparatus of claim 1, further comprising a Y-cable that carries both an Ethernet connection and a power-supply connection to one or more of the one or more network devices.

7. A data processing system comprising:
a power distribution unit comprising a power distribution circuit that is configured to distribute electrical power to one or more network devices;
a microcontroller;
data transceiving logic that is configured to establish Ethernet connectivity with the one or more network devices and the power distribution unit, to receive a first data stream from a first network device of the one or more network devices, and to generate a combined signal by combining the first data stream with a power signal into the combined signal;
one or more ports that are configured to transmit the combined signal to the one or more network devices;
in a second network device, signal processing logic that is configured to extract a request from the first data stream upon receiving the first data stream and to generate one or more responses to the request, and to use the power signal to provide electrical power to components of the second network device.

8. The data processing system of claim 7, wherein, upon finishing generating the one or more responses, the second network device transmits the one or more responses to a Y-cable transceiver implemented in the Y-cable, causing the Y-cable transceiver to generate a second data stream and transmit the second data stream to the power distribution unit.

9. The data processing system of claim 7, wherein the second network device comprises a second network device transceiver that is configured to receive the combined signal from the one or more network devices, to decompose the combined signal into the first data stream and the power signal, to transmit the first data stream to a processing unit of the second network device, and to transmit the power signal to a power unit of the second network device.

10. The data processing system of claim 7, wherein the transceiving logic is configured to extract the request from the first data stream upon receiving the first data stream, to generate one or more responses to the request, to transmit the one or more responses to a second network device transceiver configured to generate a second data stream based on the one or more responses, to transmit the second data stream to the power distribution unit; wherein, upon receiving the power signal, a power unit uses the power signal to provide electrical power to components of the second network device.

11. A method comprising:
distributing electrical power from a power distribution apparatus to one or more network devices;
establishing Ethernet connectivity with the one or more network devices and the power distribution apparatus;
receiving, by the power distribution apparatus, a first data stream from a first network device of the one or more network devices;
generating, by the power distribution apparatus, a combined signal by combining the first data stream with a power signal into the combined signal;
transmitting, from the power distribution apparatus, the combined signal to the one or more network devices, wherein the method is performed by one or more computing devices.

12. The method of claim 11, comprising combining the first data stream with the power signal by multiplexing the first data stream with the power signal into the combined signal.

13. The method of claim 11, wherein the first data stream received from the first network device comprises a request for providing any one of: a device identification data, a device port data, a cable identification data, a device platform identification data, a device local port identification data.

14. The method of claim 13, wherein the combined signal is received by a Y-cable transceiver implemented in a Y-cable; wherein the Y-cable transceiver decomposes the combined signal into the first data stream and the power signal; wherein the Y-cable transceiver transmits the first data stream to an Ethernet port of a second network device, from the one or more network devices, and transmits the power signal to a power port of the second network device.

15. The method of claim 13, wherein the combined signal is received by a second network device transceiver implemented in a second network device from the one or more network devices; wherein the second network device transceiver decomposes the combined signal into the first data stream and the power signal; wherein the second network device transceiver transmits the first data stream to a processing unit of the second network device, and transmits the power signal to a power unit of the second network device.

16. The method of claim 15, wherein, upon receiving the first data stream, the second network device extracts the request from the first data stream and generates one or more responses to the request; wherein, upon receiving the power signal, the second network device uses the power signal to provide electrical power to components of the second network device.

17. The method of claim 16, wherein, upon finishing generating the one or more responses, the second network device transmits the one or more responses to a Y-cable transceiver implemented in the Y-cable, causing the Y-cable transceiver to generate a second data stream and transmit the second data stream to the power distribution apparatus.

18. The method of claim 17, wherein, upon receiving the first data stream, the processing unit extracts the request from the first data stream, generates one or more responses to the request, and transmits the one or more responses to the second network device transceiver configured to generate a second data stream based on the one or more responses, and transmit the second data stream to the power distribution apparatus; wherein, upon receiving the power signal, the power unit uses the power signal to provide electrical power to components of the second network device.

19. The method of claim 11, wherein the connectivity with one or more of the one or more network devices is implemented in a straight cable that supports both an Ethernet connection and a power-supply connection.

20. The method of claim 11, wherein the connectivity with one or more of the one or more network devices is implemented in a Y-cable that supports both an Ethernet connection and a power-supply connection.

\* \* \* \* \*